United States Patent
Hessling Von Heimendahl et al.

(10) Patent No.: US 9,931,979 B2
(45) Date of Patent: Apr. 3, 2018

(54) SELF-CHECKING EMERGENCY LIGHT UNIT AND METHOD OF OPERATING A SELF-CHECKING EMERGENCY LIGHT UNIT

(71) Applicant: Goodrich Lighting Systems GmbH, Lippstadt (DE)

(72) Inventors: Andre Hessling Von Heimendahl, Koblenz (DE); Robert Trinschek, Hamm (DE); Siegfried Schmees, Geseke (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 392 days.

(21) Appl. No.: 14/664,146

(22) Filed: Mar. 20, 2015

(65) Prior Publication Data
US 2015/0283942 A1   Oct. 8, 2015

(30) Foreign Application Priority Data
Apr. 2, 2014 (EP) .................................. 14163209

(51) Int. Cl.
| | |
|---|---|
| B60L 1/00 | (2006.01) |
| B60Q 3/02 | (2006.01) |
| G08B 29/12 | (2006.01) |
| H02J 9/00 | (2006.01) |
| B60Q 3/80 | (2017.01) |

(52) U.S. Cl.
CPC ............. *B60Q 3/0293* (2013.01); *B60Q 3/80* (2017.02); *G08B 29/12* (2013.01); *H02J 9/00* (2013.01)

(58) Field of Classification Search
None
See application file for complete search history.

(56) References Cited

U.S. PATENT DOCUMENTS

| | | | |
|---|---|---|---|
| 2008/0266076 A1 | 10/2008 | Barrieau | |
| 2012/0080944 A1* | 4/2012 | Recker | H02J 9/02 307/25 |
| 2012/0153828 A1* | 6/2012 | Gordin | H02J 9/065 315/86 |
| 2015/0330587 A1* | 11/2015 | Lax | F21S 9/022 362/191 |

FOREIGN PATENT DOCUMENTS

| | | |
|---|---|---|
| EP | 2476616 A2 | 7/2012 |
| WO | 9204758 A1 | 3/1992 |

OTHER PUBLICATIONS

European Search Report for Application No. 14163209.1-1803, dated Oct. 21, 2014, 7 pages.

* cited by examiner

*Primary Examiner* — Cassandra Cox
(74) *Attorney, Agent, or Firm* — Cantor Colburn LLP

(57) ABSTRACT

A self-checking emergency light unit includes a power input terminal coupleable to an external power supply for receiving power therefrom, an illumination circuit coupled to the power input terminal, a discharge circuit coupled to the emergency power source, and an operational check module coupled to the emergency power source.

14 Claims, 2 Drawing Sheets

SELF-CHECKING EMERGENCY LIGHT UNIT AND METHOD OF OPERATING A SELF-CHECKING EMERGENCY LIGHT UNIT

FOREIGN PRIORITY

This application claims priority to European Patent Application No. 14 163 209.1 filed Apr. 2, 2014, the entire contents of which is incorporated herein by reference.

TECHNICAL FIELD

The invention relates to emergency lighting. In particular, it relates to emergency light units used in passenger transport vehicles, such as aircraft, ships, road vehicles and rail cars.

BACKGROUND

Emergency lighting plays an important role in many passenger transport vehicles, in particular in aircraft and ships. The emergency lighting systems of such passenger transport vehicles are designed in such a way that they function in power outage situations. In the exemplary field of aircraft emergency lighting, prior art emergency light units are coupled to an emergency power supply network that ensures power supply to the emergency light units, even if the main electricity network of the aircraft malfunctions. Due to the importance of lighting in emergency situations, very strict regulations apply to the maintenance of emergency lighting systems. As a consequence, the maintenance efforts for emergency lighting systems have become unacceptable.

Accordingly, it would be beneficial to provide an emergency light unit that allows for the maintenance requirements to be reduced. Further, it would be beneficial to provide a passenger transport vehicle whose emergency lighting system requires less maintenance. Also, it would be beneficial to provide a method of operating an emergency light unit in such a way that it requires less maintenance.

SUMMARY

Exemplary embodiments of the invention include a self-checking emergency light unit, in particular a self-checking emergency light unit of a passenger transport vehicle, such as an aircraft, a ship, a rail car or a road vehicle, the self-checking emergency light unit comprising a power input terminal coupleable to an external power supply for receiving power therefrom, an illumination circuit coupled to the power input terminal, the illumination circuit comprising at least one light source, an emergency power source coupled to the power input terminal and to the illumination circuit, wherein the emergency power source is adapted to store electrical energy received via the power input terminal and to provide electrical energy to the illumination circuit in an emergency operation, a discharge circuit coupled to the emergency power source, wherein the discharge circuit is adapted to effect a discharge of the emergency power source in a power down operation, and an operational check module coupled to the emergency power source, wherein the operational check module is configured to sense at least one electric characteristic of the emergency power source during the power down operation and to determine an operational status of the emergency power source from the at least one electric characteristic during the power down operation.

The provision of this emergency light unit drastically reduces the required maintenance efforts. The emergency light unit is highly autonomous in that it includes its own emergency power source and is able to test the functioning of the emergency power source on its own. The testing is very reliable, because it does not rely on secondary indicators, but on a monitoring of the immediate electrical behavior of the emergency power source during the power down operation of the emergency light unit. The sensing of at least one electric characteristic of the emergency power source, such as the voltage at the emergency power source or the current flowing from the emergency power source, allows for a reliable deduction of the functionality of the emergency power source. For example, the operational check module may be able to deduce the capacity of the emergency power source to provide sufficient electrical energy in an emergency situation from the immediate electrical characteristic(s). A true functionality test is carried out by the operational check module. The determination of the operational status of the emergency power source allows for the emergency light unit to convey that information to a board computer or to maintenance personal out of its own motion. Alternatively, the determination of the operational status of the emergency power source allows for a storing of that information within the emergency light unit, which information may be read out easily at an appropriate point in time. In either case, the maintenance effort is reduced to a mere receiving or reading out of the operational status information. The need to perform a separate maintenance operation is eliminated. The emergency light unit is able to perform a self-check during regular power down operations.

The self-checking emergency light unit may be configured in such a way that the emergency power source is charged during a power up operation and/or during normal operation, i.e. during non-emergency operation. In other words, it is possible that the emergency power source is charged at any time the self-checking emergency light unit is coupled to the external power supply and receives power therefrom. In particular, the emergency power source may be charged in a power up operation, i.e. when the external power supply is switched on or when a power up signal is received or when the self-checking emergency light unit is switched on. The emergency power source may maintain its charge as long as it is switched on. In this way, there is sufficient charge available for illuminating the at least one light source, should an emergency situation arise and no power be available from the external power source. In this state of awaiting a potential emergency, which is also referred to as armed state or normal operation or stand-by operation, the charged state of the emergency power source may be maintained on its own or by continuous re-charging from the external power source, should there be leakage from the emergency power source.

The term emergency operation may refer to the operation of the self-checking emergency light unit in a loss of power situation, i.e. when no power is provided by the external power supply at the power input terminal. The self-checking emergency light unit may deduce from the loss of power situation that an emergency is present and that the illumination of the at least one light source is to be effected by the emergency power source. Alternatively/additionally, it is also possible that the emergency operation may be triggered by an emergency signal received from outside of the self-checking emergency light unit.

The illumination circuit may comprise exactly one light source or a plurality of light sources. In addition, the illumination may comprise a power conditioning module to provide power to the at least one light source in a suitable form. For example, the illumination may comprise one or more LED's and a suitable current source for providing the one or more LED's with a suitable current level.

The discharge circuit may be configured to provide a discharge path for electrical energy from the emergency power source. In an exemplary embodiment, the discharge circuit may comprise a resistor and a switch. By providing a discharge circuit, the self-checking emergency light unit is able to effect a fast discharge of the emergency power source, thus achieving a fast determination of the operational status of the emergency power source. As compared to the discharge of the emergency power source via the illumination circuit, the discharge via the discharge circuit may be more than 20 times, in particular more than 40 times, further in particular more than 60 times as fast. While the discharge via the illumination circuit is designed to last an expected duration of an emergency, such as 10 or 20 or 30 minutes, the fast discharge via the discharge circuit may allow for a quick power down operation and a determination of the operational status of the emergency power source within seconds.

The operational check module may be implemented in hardware only, having suitable sensors, timers, memory and logic circuits. It is also possible that the operational check module may be implemented with a combination of hardware and software, with suitable sensors providing inputs to a microprocessor that runs a program which performs the determination of the operational status.

The self-checking emergency light unit may be an aircraft emergency light unit, a ship emergency light unit, a rail car emergency light unit or a road vehicle emergency light unit. It is also possible that the self-checking emergency light unit is a building emergency light unit. In general, the self-checking emergency light unit may be used in every application where emergency light units must be maintained and checked for proper operation.

According to a further embodiment, the emergency power source comprises at least one capacitor and/or at least one supercapacitor, with the operational status being a capacitance status of the at least one capacitor and/or the at least one supercapacitor. In other words, the emergency power source may comprise one or a plurality of capacitors, or it may comprise one or a plurality of supercapacitors, or it may comprise a combination of one or more capacitors and one or more supercapacitors. When comprising capacitors and/or supercapacitors, the emergency power source has a capacitance that depends on the capacitors and/or supercapacitors and their connection(s). Said capacitance value may change over time due to the degrading or failing of one or more of the capacitors/supercapacitors. The operational check module may be adapted to determine a capacitance status of the one or more capacitors and/or supercapacitors from the at least one electric characteristic during the power down operation. In this case, the operational check module is a capacitance check module. By determining the capacitance of the capacitor(s)/supercapacitor(s), the operational check module is able to determine if the emergency power source is still capable to provide sufficient electrical energy to the illumination circuit in the emergency operation. It is pointed out that it is also possible that the emergency power source is a rechargeable battery. A combination of one or more rechargeable batteries and one or more capacitor(s)/supercapacitor(s) is also possible.

According to a further embodiment, the at least one light source is at least one LED. In other words, the illumination circuit may comprise one LED or a plurality of LED's. The plurality of LED's may be connected in series, ensuring the same illumination current in all LED's. The provision of LED's allows for a very energy-efficient self-checking emergency light unit with a long life expectancy.

According to a further embodiment, the operational status indicates whether the at least one electric characteristic complies with one or more preset criteria for the power down operation. In other words, the operational status is a piece of information that indicates whether the emergency power source functions according to the specification. In yet other words, the proper functioning of the emergency power source may be defined as the satisfaction of one or more preset criteria for the power down operation, with the operational status being an indication whether or not the emergency power source functions properly. A non-compliance with the one or more preset criteria may also be referred to as a malfunction of the emergency power source. The preset criteria may be particular voltage and/or current values at particular times and/or particular voltage and/or current courses over time and/or particular voltage and/or current gradients and/or other parameters that may be calculated from the voltage and/or current values during the power down operation. The preset criteria may be chosen in such a way that they allow for a reliable assessment of the capacity of the emergency power source to provide sufficient electrical energy in an emergency operation. The operational status may be a single bit of operation, indicating whether or not the emergency power source functions in accordance with the specification. However, it is also possible that the operational status contains more information, such as by what margin the at least one electric characteristic exceeds/fails the one or more preset criteria.

According to a further embodiment, the operational status is by default set to indicate a malfunction of the emergency power source after a power up operation and the operational status indicates a proper functioning of the emergency power source after the power down operation if the at least one electric characteristic complies with one or more preset criteria for the power down operation. In other words, the operational status may be seen as a variable that indicates whether or not the emergency power source functions properly and/or how well the emergency power source functions. That variably may be set during the power up operation to indicate a malfunction of the emergency power source. The operational check module may be set up to convey or have said information ready at the end of the power down operation or at the beginning of the next power up operation. The operational check module may further be adapted to update the operational status if it determines during the power down operation that the emergency power source functions properly. In this way, the self-checking emergency light unit will indicate a malfunction unless the operational status is actively set to indicate a proper functioning after a successful power down operation. This in turn allows for an additional layer of safety, as all functional errors until the point of the power down operation are recognized Only a proper functioning of the emergency power source until the power down operation leads to the operational status indicating said proper functioning.

According to a further embodiment, the operational check module is configured to sense a voltage level of the emergency power source. In other words, the at least one electric characteristic includes a voltage level of the emergency power source. The voltage level at a particular point in time during the power down operation and/or the voltage course over time during the power down operation contain much information on the functioning of the emergency power source. Voltage readings are comparably simple to obtain and allow for an implementation of the operational check module with low complexity.

According to a further embodiment, the operational check module is configured to sense the voltage level of the emergency power source after a preset discharge time of the power down operation and to determine the operational status of the emergency power source on the basis of the voltage level sensed after the preset discharge time. In this way, the operational check module is able to check if the discharge speed of the emergency power source is within an acceptable range. On the basis of this information, the operational check module may deduce if the capacity of the emergency power source, in particular the capacitance of the capacitor(s)/supercapacitor(s), is sufficiently high to store enough charge for an emergency situation. In other words, the monitoring of the discharge speed via the discharge circuit allows for an accurate deduction if the emergency power source functions properly.

According to a further embodiment, the operational check module is configured to compare the voltage level of the emergency power source after the preset discharge time to a preset minimum required voltage value. The minimum required voltage value may be a finite voltage value, but may also be 0 V. In this way, the proper functioning of the emergency power source may be easily determined via a simple comparison of two values. For example, it is possible that the minimum required voltage value is 0 V and that the preset discharge time is 75% of the time expected for a full discharge of the emergency power source via the discharge circuit. In other words, if no charge is left in the emergency power source after 75% of the time expected for the full discharge, the operational check module determines that the emergency power source malfunctions. According to another example, the preset minimum required voltage value may be 25% of the voltage at the emergency power source when fully charged and the preset discharge time may be 60% of the time expected for the full discharge. It is pointed out that other preset minimum required voltage values and other preset discharge times are possible as well.

According to a further embodiment, the operational check module is configured to sense the voltage level of the emergency power source and to sense a current flow from the emergency power source during the power down operation, and the operational check module is configured to determine the operational status of the emergency power source from the current flow and the voltage level over time during the power down operation. In other words, the operational check module may be configured to check if the current and voltage values during the power down operation line up in an expected manner. In yet other words, the operational check module may be configured to check if the current and voltage values during the power down operation indicate that the emergency power source has sufficient capacity for storing electrical energy. In the example of the emergency power source being a capacitance, i.e. in the example of the emergency power source comprising one or more capacitors/supercapacitors, the capacitance value of the emergency power source may be determined from the relation of the current from the emergency power source and the voltage gradient. In mathematical terms, the capacitance value C may be calculated by the equation $C=I/(dU/dt)$. Accordingly, by monitoring the voltage drop over a test interval and relating said voltage drop to the current during the test interval, the capacitance of the emergency power source may be calculated. The operational status may then contain the information on the calculated capacitance. In particular, the operational status may indicate whether the calculated capacitance is above a preset acceptable capacitance threshold.

According to a further embodiment, the operational check module is configured to convey the operational status of the emergency power source via a status information signal, and/or the operational check module is configured to store the operational status of the emergency power source for being read out. In this way, the self-checking emergency light unit may communicate its operational status to the outside world, e.g. to a maintenance computer or to maintenance personnel or to a failure message collecting and analysing institution, etc. The communication of the operational status of the emergency power source may take place at the end of the power down operation or at the beginning of the next power up operation or at another appropriate point in time. The status information signal may be a wired or wireless electric signal. It is also possible that the status information signal is an optical signal, such as a flashing of the at least one light source of the illumination circuit or the lighting up of an additional signalling light source. When stored for being read out, the operational status may be read out of a memory by a wired or wireless memory reading device.

According to a further embodiment, the operational status may contain a request for inspection and/or a request for maintenance and/or a warning about a critical or almost critical condition of the emergency power source. In this way, the operational status is adapted to convey a direct command to the receiver/reader thereof with respect to a desired action to be performed.

According to a further embodiment, the operational check module comprises at least one of a voltage sensor for sensing the voltage at the emergency power source and a current sensor for sensing the current flowing from the emergency power source. In addition, the operational check module may comprise a timer and a logic circuit for processing the sensed voltage and/or current values. Alternatively, the operational check module may additionally comprise a microprocessor and a memory, with the microprocessor being adapted to run a program to determine the operational status of the emergency power source from the sensed voltage and/or current values. In other words, the operational check module may be implemented in hardware only or in a combination of hardware components and a program being run on a microprocessor.

According to a further embodiment, the operational check module is a module separate from a light unit control of the self-checking emergency light unit. In other words, the operational check module is independent from the control entity that controls the on/off switching of the illumination circuit. In this way, a separate entity is present, which separate entity may be maintained and replaced separately, thereby reducing maintenance complexity. Also, with the operational check module not being as important in terms of safety as the light unit control, a less cumbersome certification procedure may be taken advantage of as compared to the option of including the operational check module into the light unit control.

According to a further embodiment, the operational check module is configured to monitor at least one of the following parameters: a duration of a charging operation of the emergency power source, a charge current during the charging operation of the emergency power source, a voltage at the emergency power source after the charging operation, a linearity of the voltage at the emergency power source, a voltage drop speed at the emergency power source after the charging operation, a leakage current from the emergency power source after the charging operation, a trickle charge current to the emergency power source after the charging operation. The operational check module may be further be configured to generate a warning signal and/or to store a warning information for being read out, if one of the monitored parameters is outside a respective acceptable parameter range. It is pointed out that the operational check module may be configured to monitor none or exactly one or all or any subset of these parameters. By monitoring one or more of the parameters, the operational check module is able to collect additional information that may point into the direction of a malfunction of the emergency power source. While these parameters do not rely on an actual test of the functioning of the emergency power source, as is the case with the sensing of at least one electric characteristic during the power down operation, they still contain valuable information on the health of the emergency power source.

Exemplary embodiments of the invention further include a passenger transport vehicle, such as an aircraft, a ship, a road vehicle or a rail car, comprising at least one self-checking emergency light unit, as described in any of the embodiments above. Above described modifications and advantages equally relate to the passenger transport vehicle. A passenger transport vehicle may have a plurality of above described self-checking emergency light units.

Exemplary embodiments of the invention further include a method of operating a self-checking emergency light unit having an emergency power source, an illumination circuit with at least one light source, and a discharge circuit. The method comprises the steps of charging the emergency power source in a power up operation, with the emergency power source ensuring provision of power to the illumination circuit in an emergency operation, discharging the emergency power source via the discharge circuit in a power down operation, monitoring at least one electric characteristic of the emergency power source during the power down operation, and determining an operational status of the emergency power source on the basis of the monitoring of the at least one electric characteristic of the emergency power source during the power down operation. The functions and advantages described above with respect to the self-checking emergency light unit are analogously achieved with the method of operating the self-checking emergency light unit. The additional features and modifications described above with respect to the self-checking emergency light unit analogously apply to the method of operating the self-checking emergency light unit.

According to a further embodiment, the step of monitoring at least one electric characteristic of the emergency power source comprises sensing a voltage level of the emergency power source after a preset discharge time of the power down operation, and the step of determining the operational status of the emergency power source comprises comparing the voltage level of the emergency power source after the preset discharge time to a preset minimum required voltage value. In this way, a true test of the functioning of the emergency power source may be achieved with low complexity. One instance of voltage sensing at a particular point in time is sufficient for the true test.

According to a further embodiment, the step of monitoring at least one electric characteristic of the emergency power source comprises sensing a voltage level of the emergency power source and sensing a current flow from the emergency power source during the power down operation, and the step of determining the operational status of the emergency power source comprises calculating the operational status of the emergency power source from the current flow and the voltage level over time during the power down operation. In this way, the operational check module is able to check if the voltage drop and the current flow line up in an expected manner. In the particular case of the emergency power source being one or more capacitor(s)/supercapacitor(s), this embodiment allows for the operational check module to calculate the actual capacitance of the emergency power source and to determine if the actual capacitance is sufficient for the emergency operation requirements.

BRIEF DESCRIPTION OF THE DRAWINGS

Embodiments of the invention are described in greater detail below with reference to the Figures.

DETAILED DESCRIPTION

Figure 1:
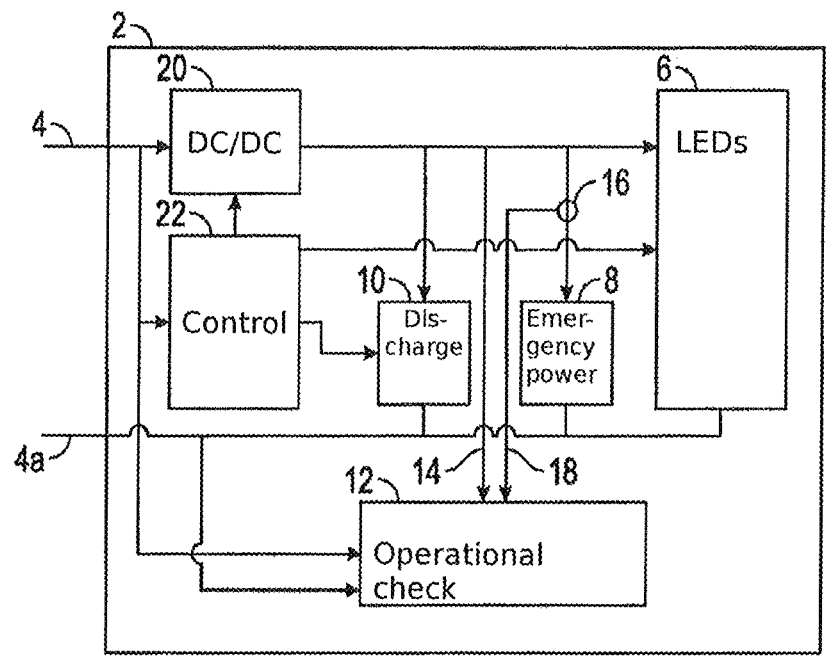
FIG. 1 shows a block diagram of an exemplary self-checking emergency light unit in accordance with the invention.

FIG. 1 shows a block diagram of an exemplary self-checking emergency light unit 2 in accordance with the invention. Being a block diagram, FIG. 1 shows the functional units of the self-checking emergency light unit 2 with respect to the electric connections, i.e. with respect to the power transfer and signal transfer connections. In order to provide a clear representation of the exemplary embodiment of the invention, the mechanical elements of the self-checking emergency light unit 2, such as a mounting plate, a lens cover, a housing, a heat discharge structure, etc. are omitted from the drawings. It is apparent to the skilled person that the self-checking emergency light unit 2 also comprises such elements.

The self-checking emergency light unit 2 has two external terminals, namely a power input terminal 4 and a ground terminal 4a. The power input terminal 4 is coupleable to a power supply system outside of the self-checking emergency light unit 2, i.e. to an external power supply. In the exemplary embodiment of an aircraft, the power input terminal 4 may be connected to an emergency power supply network of the aircraft. The ground terminal 4a may also be coupled to the external power supply, in particular to a ground rail thereof. It is also possible that the ground terminal 4a is coupled to any other structure or electric connection that provides a reliable electric ground to the self-checking emergency light unit 2.

The self-checking emergency light unit 2 comprises an illumination circuit 6, an emergency power source 8, a discharge circuit 10, an operational check module 12, a power conversion circuit 20, and a light unit control 22. The power input terminal 4 is coupled to the operational check module 12, to the power conversion circuit 20, and to the light unit control 22. The power input terminal 4 provides these three units with electrical power for their operation.

In the exemplary embodiment of FIG. 1, the power received via the power input terminal 4 further contains a modulation that represents control signals from an external emergency lighting system in order to control to the self-checking emergency light unit 2. In this way, the power received at the power input terminal 4 also contains control signals to the light unit control 22 and to the operational check module 12. It is pointed out that the power received at the power input terminal 4 does not have to contain such modulation. It is also possible that a separate signal line is provided that provides control signals to the light unit control 22 and to the operational check module 12.

The light unit control 22 is coupled to the power conversion circuit 20 and to the discharge circuit 10 for controlling the two. In particular, the light unit control 22 is able to selectively switch on the power conversion circuit 20 in order to put the self-checking emergency light unit 2 in operation. Further, the light unit control 22 is able to control a switch in the discharge circuit 10 in order to selectively provide a conductive path through the discharge circuit 10. In the exemplary embodiment of FIG. 1, the power conversion circuit 20 is a DC/DC converter that converts the power received at the power input terminal 4 to a power level that is suitable for driving the illumination circuit 6.

The discharge circuit 10 is coupled between the output of the power conversion circuit 20 and the ground terminal 4a. In the exemplary embodiment of FIG. 1, the discharge circuit 10 comprises a resistor and a switch, which switch is controlled by the light unit control 22. Further, the emergency power source 8 is also coupled between the output of the power conversion circuit 20 and the ground terminal 4a. In this way, the emergency power source 8 may be charged from the power input terminal 4 via the power conversion circuit 20. In the exemplary embodiment of FIG. 1, the emergency power source 8 is a capacitor with sufficient capacitance to provide the illumination circuit 6 with electrical energy during an emergency operation. The illumination circuit 6 is also coupled between the output of the power conversion circuit 20 and the ground terminal 4a.

The illumination circuit 6 comprises at least one light source. In the exemplary embodiment of FIG. 1, the illumination circuit 6 comprises a plurality of LED's, which LED's are coupled in series between the output of the power conversion circuit 20 and the ground terminal 4a. The illumination circuit 6 may further comprise a current regulator in order to ensure the provision of a constant current to the plurality of LED's, resulting in a constant illumination provided by the self-checking emergency light unit 2. It is pointed out that such current regulation may also be contained in the power conversion circuit 20.

A first sensor input 14 of the operational check module 12 is coupled to the output of the power conversion circuit 20. Via the first sensor input 14, the operational check module 12 is able to sense the voltage level of the emergency power source 8. A second sensor input 18 of the operational check module 12 is coupled to a current sensor or current meter 16. The current meter 16 is associated with the connection between the power conversion circuit 20 and the emergency power source 8. In this way, the operational check module 12 is able to sense the current flow to/from the emergency power source 8 via the second sensor input 18.

Figure 2:
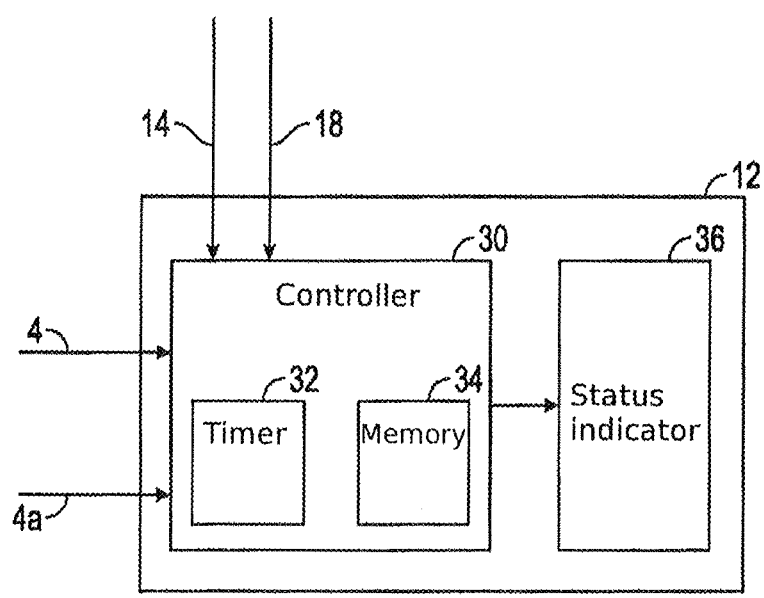
FIG. 2 shows a block diagram of an exemplary operational check module to be used with a self-checking emergency light unit in accordance with the invention.

FIG. 2 shows an exemplary embodiment of the operational check module 12 of FIG. 1, which is part of the self-checking emergency light unit 2. As discussed above with reference to FIG. 1, the operational check module 12 is coupled to the power input terminal 4 for receiving power as well as for receiving control signals. It is also coupled to the ground terminal 4a. Further, the operational check module 12 has the first sensor input 14 for sensing the voltage level of the emergency power source 8 and the second sensor input 18 for sensing the current flow to/from the emergency power source 8. All four of these external connections are coupled to a controller 30 of the operational check module 12. The controller 30 comprises a timer 32, a memory 34 as well as processing logic and/or a microprocessor with a control program stored thereon (not shown). The controller 30 is coupled to an operational status indicator 36. The operational status indicator 36 may be an optical operational status indicator, such as an LED, or a signal transmitter, such as a wireless signal transmitter, or any other entity suitable for conveying information.

Figure 3:
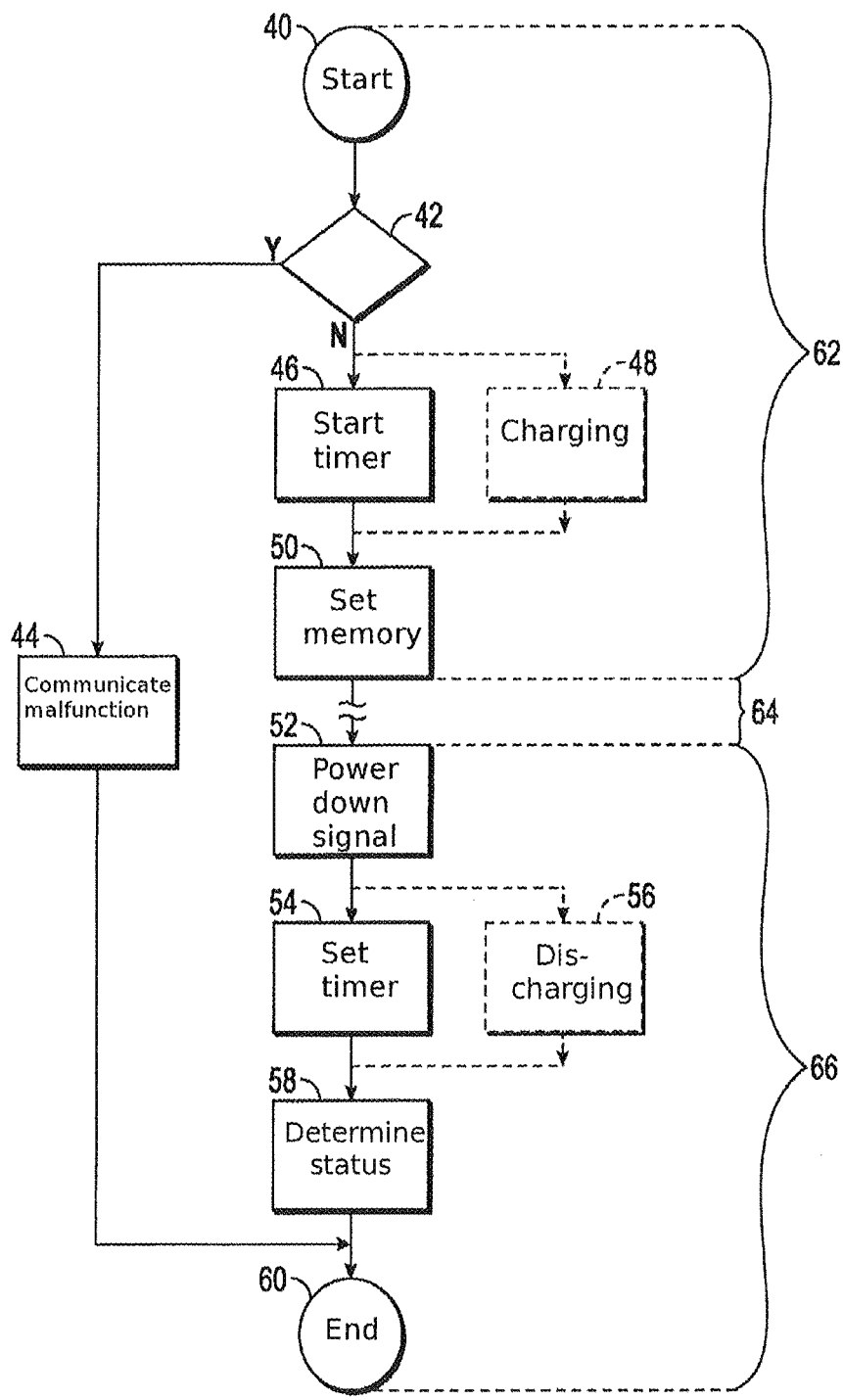
FIG. 3 shows a flow diagram of an operation cycle of an exemplary operational check module in accordance with the invention.

The operation of the operational check module 12 is now described with respect to the flow diagram of FIG. 3. The concurrent operation of the other elements of the self-checking emergency light unit 2 is described as well. At start 40, an external power up signal is received by the self-checking emergency light unit 2, which signal is accordingly received by the light unit control 22 and by the controller 30 of the operational check module 12. This power up signal marks the beginning of a power up operation 62. At decision 42, the operational check module 12 checks if a malfunction of the emergency power source 8 has been indicated. For now, it is assumed that no malfunction is indicated, such that the power up operation 62 continues with step 46. At step 46, the controller of the operational check module 12 starts the timer 32. In the exemplary embodiment of FIG. 3, the timer 32 is set to 10 minutes.

As a response to the power up signal, the light unit control 22 ensures that the switch of the discharge circuit 10 is open and starts a power transfer from the power input terminal 4 through the power conversion circuit 20. With the power transfer through the power conversion circuit 20 in place, the power from the power input terminal 4 is provided to the capacitor 8 and to the illumination circuit 6. Hence, the self-checking emergency light unit 2 lights up, with the at least one light source of the illumination circuit 6 receiving an appropriate current. In addition, the capacitor 8 is charged. This charging of the capacitor 8 is illustrated in the flow chart of FIG. 3 by step 48. As discharging takes place outside of the operational check module 12, step 48 is illustrated with dashed lines.

After the timer 32 has expired, step 50 concludes the power up operation 62. At step 50, the controller 30 of the operational check module 12 sets the memory 34 to indicate a malfunction of the emergency power source 8. While this indication is stored in the memory 34, it is not communicated to the operational status indicator 36 at step 50.

After the power up operation 62, the operational check module 12 as well as the whole self-checking emergency light unit 2 enters normal operation, which is also referred to as a stand-by operation or an armed state of the self-checking emergency light unit 2. This is the regular operation of the self-checking emergency light unit, wherein the illumination circuit 6 is driven by a suitable current, such that the at least one light source is lit up, and wherein the self-checking emergency light unit 2 waits for a potential emergency situation.

In the exemplary embodiment of an aircraft, this normal operation corresponds to the operation of the self-checking emergency light unit during flight. The emergency lighting, such as the exit signs at appropriate positions in the cabin, are lit up, with the power coming from the emergency lighting power supply network. It is also possible that the self-checking emergency light unit 2 awaits an emergency without the at least one light source being illuminated. This is for example the case for the floor guiding lights of an aircraft that only light up in the case of an emergency.

If no emergency takes place, a reception of an external power down signal at step 52 ends the normal operation 64 and initiates a power down operation 66. After receiving the power down signal, the controller 30 of the operational check module 12 sets the timer 32 to a preset discharge time. In the exemplary embodiment of FIG. 3, the preset discharge time is 7.5 s.

As explained above, the power down signal is also received by the light unit control 22. The light unit control 22 switches off the power transfer via the power conversion circuit 20 and closes the switch of the discharge circuit 10. This leads to a discharge of the capacitor 8 via the resistor contained in the discharge circuit 10. This discharge is illustrated at step 56 in the flow chart of FIG. 3, again shown in dashed lines. In the exemplary embodiment of the FIGS., the resistor of the discharge circuit 10 is dimensioned in such a way that the full charge of the capacitor 8 in the armed state is discharged in 10 s.

At step 58, the determination of the operational status of the emergency power source 8, i.e. of the capacitor 8, is made. As the expected discharge time of the capacitor is 10 s and as the timer 32 was set to 7.5 s at step 54, the controller 30 expects some charge to be left on the capacitor 8 at step 58. In other words, the controller 30 of the operational check module 12 expects the voltage at the capacitor 8 to be non-zero at the expiration of the timer 32. Accordingly, the controller 30 of the operational check module 12 is configured to determine a proper functioning of the emergency power source 8 if a voltage of more than 0V is sensed via the first sensor input 14 at step 58. In this case, the controller 30 sets the memory 34 to indicate a proper functioning of the emergency power source 8. In the situation where the controller 30 senses a voltage of 0V or a voltage of a negligible value via the first sensor input 14 at step 58, it does not change the memory 34 and leaves it to indicate a malfunction of the emergency power source 8. After step 58, the operation of the self-checking emergency light unit 2 and of the operational check module 12 terminates at end 60, which also marks the end of the power down operation 66.

At the end of the power down operation 66, the operational status of the emergency power source 8 is saved in the memory 34 of the operational check module 12. At the beginning of the next operation cycle, i.e. at the start 40 of the next power up operation 62, the operational status of the emergency power source 8 is still contained in memory 34. Accordingly, at step 42 of the next power up operation 62, the controller 30 of the operational check module 12 checks the memory 34 for the operational status of the emergency power source 8. If a malfunction is indicated at decision 42, the operational check module 12 enters step 44, in which the malfunction is communicated. In particular, the controller 30 signals to the operational status indicator 36 that a malfunction of the emergency power source 8 was detected. As a response thereto, the operational status indicator 36 illuminates a signalling LED or sends a malfunction signal or conveys the information about the malfunction in another suitable manner to a maintenance computer or to maintenance personal or to cabin personal in the environment of an aircraft or to any other suitable entity of the outside world.

From above description, it is apparent that only the voltage sensing via the first sensor input 14 is sufficient for carrying out the routine of FIG. 3. In other words, the current sensing via the current meter 16 and the second sensor input 18 is not necessary for carrying out the routine of FIG. 3. However, the determination of the operational status may also be performed via alternative/additional routines.

In another exemplary embodiment, steps 54 and 58 may be altered as compared to the routing described above. In particular, the timer 32 may by set to a short test interval at step 54, such as to an interval of 1 s. During that time, the controller 30 may sense the current flow via the second sensor input 18 and determine a voltage drop via the first sensor input 14. From the voltage drop and the current sensed, the controller 30 may calculate the capacitance of the capacitor 8 at step 58. If the calculated capacitance is above an acceptable capacitance threshold value, the controller 30 may set the memory 34 to indicate a proper functioning of the emergency power source 8. Other ways of determining the operational status are possible as well. It is pointed out that the operational check module 12 may make use of the sensed voltage and/or the sensed current in any suitable manner to determine if the emergency power source 8 functions according to specification or not.

The operational check module 12 may further be adapted to carry out one or more ancillary checks on the basis of the sensed voltage and/or sensed current. For example, the operational check module may monitor if the charging of the emergency power source 8 happens within an acceptable time frame in the power up operation. It is also possible that the operational check module 12 monitors if the charge current to the emergency power source 8 is within an acceptable range in the power up operation. It is further possible that the operational check module 12 monitors if the voltage at the emergency power source 8 is within an acceptable range after the power up operation. Further, it is also possible that the operational check module monitors the voltage at the emergency power source for non-linear behaviour, with non-linearities in the voltage level indicating a failing of the component. Further, it is possible that the operational check module monitors if a discharge speed of the emergency power source 8 during normal operation and/or if a leakage current from the emergency power source 8 during normal operation an/or if a required trickle charge current to the emergency power source 8 during normal operation is/are within acceptable limits. The operational check module may be configured to perform none or one or all or any subset of these ancillary checks. The operational check module may further be configured to provide a respective warning signal or to store respective warning information if one or more or all of the monitored parameters are outside of the respective acceptable ranges.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. Self-checking emergency light unit for a passenger transport comprising:
   a power input terminal coupleable to an external power supply for receiving power therefrom,
   an illumination circuit coupled to the power input terminal, the illumination circuit comprising at least one light source,
   an emergency power source coupled to the power input terminal and to the illumination circuit, wherein the emergency power source is adapted to store electrical energy received via the power input terminal and to provide electrical energy to the illumination circuit in an emergency operation, a discharge circuit coupled to the emergency power source, wherein the discharge circuit is adapted to effect a discharge of the emergency power source in a power down operation, and an operational check module coupled to the emergency power source, wherein the operational check module is configured to sense at least one electric characteristic of the emergency power source during the power down operation and to determine an operational status of the emergency power source from the at least one electric characteristic during the power down operation, wherein the operational status is by default set to indicate a malfunction of the emergency powers source after a power up operation and wherein the operational status indicates a proper functioning of the emergency power source after the power down operation if the at least one electric characteristic complies with one or more preset criteria for the power down operation.

2. Self-checking emergency light unit according to claim 1, wherein the emergency power source comprises at least one capacitor and/or at least one supercapacitor, with the operational status being a capacitance status of the at least one capacitor and/or the at least one supercapacitor.

3. Self-checking emergency light unit according to claim 1, wherein the at least one light source is at least one LED.

4. Self-checking emergency light unit according to claim 1, wherein the operational status indicates whether the at least one electric characteristic complies with one or more preset criteria for the power down operation.

5. Self-checking emergency light unit according to claim 1, wherein the operational check module is configured to sense a voltage level of the emergency power source.

6. Self-checking emergency light unit according to claim 5, wherein the operational check module is configured to sense the voltage level of the emergency power source after a preset discharge time of the power down operation and to determine the operational status of the emergency power source on the basis of the voltage level sensed after the preset discharge time.

7. Self-checking emergency light unit according to claim 6, wherein the operational check module is configured to compare the voltage level of the emergency power source after the preset discharge time to a preset minimum required voltage value.

8. Self-checking emergency light unit according to claim 7, wherein the operational check module is configured to further sense a current flow from the emergency power source during the power down operation and wherein the operational check module is configured to determine the operational status of the emergency power source from the current flow and the voltage level over time during the power down operation.

9. Self-checking emergency light unit according to claim 1, wherein the operational check module is configured to convey the operational status of the emergency power source via a status information signal, and/or
wherein the operational check module is configured to store the operational status of the emergency power source for being read out.

10. Self-checking emergency light unit according to claim 1, wherein the operational check module is configured to monitor at least one of the following parameters:
a duration of a charging operation of the emergency power source, a charge current during the charging operation of the emergency power source,
a voltage at the emergency power source after the charging operation,
a linearity of the voltage at the emergency power source,
a voltage drop speed at the emergency power source after the charging operation,
a leakage current from the emergency power source after the charging operation,
a trickle charge current to the emergency power source after the charging operation; and
wherein the operational check module is configured to generate a warning signal and/or to store a warning information for being read out, if one of the monitored parameters is outside a respective acceptable parameter range.

11. Passenger transport vehicle comprising at least one self-checking emergency light unit according to claim 1.

12. Method of operating a self-checking emergency light unit having an emergency power source, an illumination circuit with at least one light source, and a discharge circuit, the method comprising the steps of:
charging the emergency power source in a power up operation, with the emergency power source ensuring provision of power to the illumination circuit in an emergency operation,
discharging the emergency power source via the discharge circuit in a power down operation,
monitoring at least one electric characteristic of the emergency power source during the power down operation, and
determining an operational status of the emergency power source on the basis of the monitoring of the at least one electric characteristic of the emergency power source during the power down operation, wherein the operational status is by default set to indicate a malfunction of the emergency power source after a power up operation and wherein the operational status indicates a proper functioning of the emergency power source after the power down operation if the at least one electric characteristic complies with one or more preset criteria for the power down operation.

13. Method of operating a self-checking emergency light unit according to claim 12, wherein the step of monitoring at least one electric characteristic of the emergency power source comprises sensing a voltage level of the emergency power source after a preset discharge time of the power down operation, and
wherein the step of determining the operational status of the emergency power source comprises comparing the voltage level of the emergency power source after the preset discharge time to a preset minimum required voltage value.

14. Method of operating a self-checking emergency light unit according to claim 12, wherein the step of monitoring at least one electric characteristic of the emergency power source comprises sensing a voltage level of the emergency power source and sensing a current flow from the emergency power source during the power down operation, and
wherein the step of determining the operational status of the emergency power source comprises calculating the operational status of the emergency power source from the current flow and the voltage level over time during the power down operation.

* * * * *